Dec. 2, 1952        E. M. WOOCK        2,619,767
CROP DUSTING UNIT
Filed Dec. 20, 1947
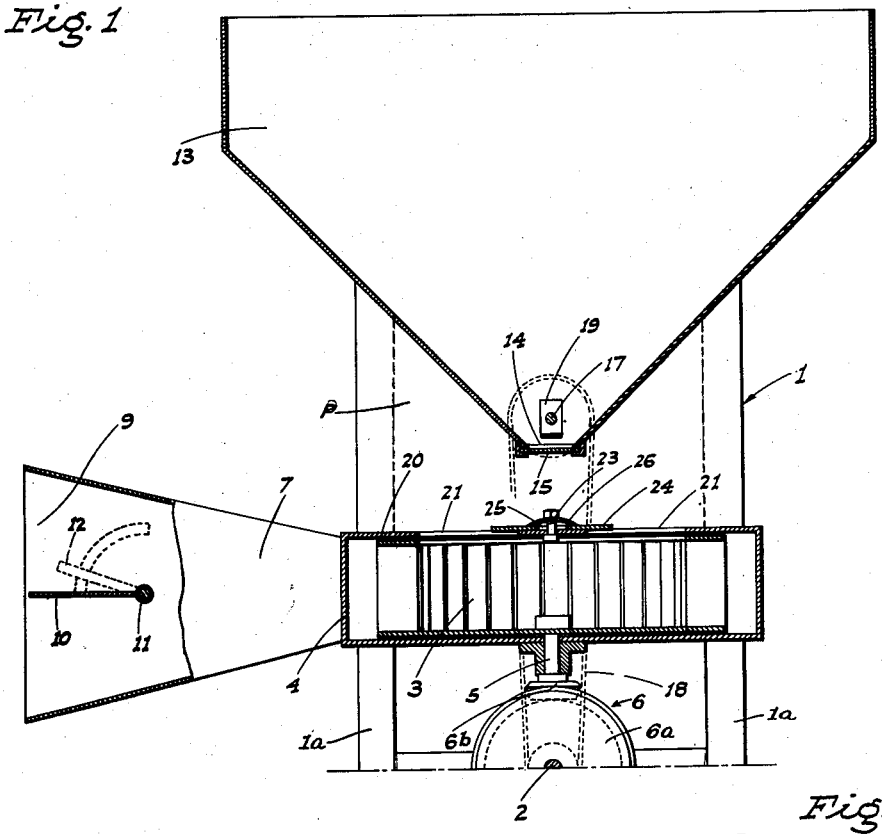
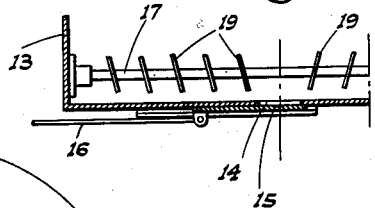
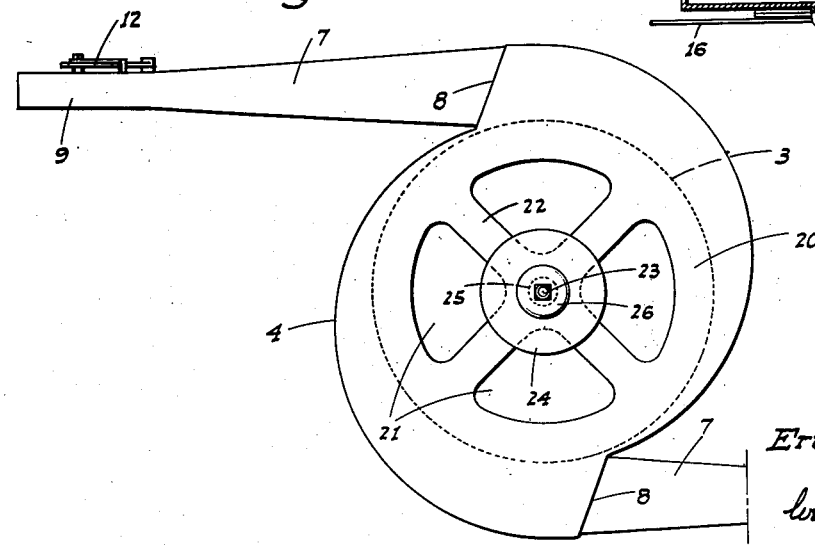
INVENTOR
Eric M. Woock
ATTORNEYS Patented Dec. 2, 1952

2,619,767

UNITED STATES PATENT OFFICE 2,619,767

CROP DUSTING UNIT

Eric M. Woock, Lodi, Calif.

Application December 20, 1947, Serial No. 793,024

2 Claims. (Cl. 43—148)

This invention relates generally to improvements in crop dusting units of the power actuated, vehicle mounted type; such units being useful to distribute dusts such as insecticides, commerical fertilizers, or the like.

One object of the present invention is to provide a crop dusting unit which comprises a feed hopper and a squirrel-cage blower in novel assembly.

Another object of the invention is to provide the above assembly with a novel adjustable distributor plate at the intake of the blower; such distributor plate being adjustable to control the proportionate delivery of dust to various points in the path of travel of the blower. This is a very important feature as the proper proportioning of the dust delivery to the blower is essential to effective dusting operations; dusts of different granular size or weight requiring different adjustments of the distributor plate.

An additional object is to provide a crop dusting unit which includes an improved discharge nozzle structure.

A further object of the invention is to produce a practical and reliable device and one which will be effective for the purpose for which it is designed.

These objects are accomplished by means of such structure and relative arrangement of parts as will fully appear by a perusal of the following specification and claims.

In the drawings:

Figure 1 is a sectional elevation of the improved crop dusting unit with the lower end of the support being omitted.

Figure 2 is a plan view of the blower including the adjustable distributor plate the hopper being removed.

Figure 3 is an enlarged fragmentary sectional elevation of the agitator mechanism and adjacent feed control shutter or valve.

Referring now more particularly to the characters of reference on the drawings, the improved crop dusting unit comprises an upstanding supporting frame 1 adapted to be mounted on a vehicle for transport along the ground, and which includes transversely spaced uprights 1a said supporting frame 1 having a horizontal drive shaft 2 journaled therein and driven by any convenient power means (not shown).

A vertical axis blower 3 is mounted in the supporting frame 1 above the drive shaft 2, and such blower includes an enclosed housing 4. The blower is of the squirrel cage type.

A spindle 5 projects downwardly from the blower 3 and is driven from the drive shaft 2 by a gear assembly 6 which comprises a bevel gear 6a on the shaft 2 and a cooperating bevel pinion 6b on spindle 5.

Discharge pipes 7 are connected to opposed outlets 8 of the blower housing 4 and project laterally in opposite directions. These discharge pipes 7 are flat sided and decrease in width horizontally toward their outer ends; but increase in height to said ends to form relatively narrow but vertically elongated nozzles or discharge openings 9 whose area is substantially the same as the area at the intake end of pipes 7.

Each nozzle 9 is fitted therein with a vertically adjustable deflector vane 10 pivoted at its inner end, as at 11, in the corresponding nozzle centrally of its height and adjustable, vertically, by suitable means such as an exterior control lever 12. These deflector vanes 10 predetermine the height of distance above the ground to which the dust will be thrown.

Above the blower 3 the unit includes, in spaced relation, a hopper 13 having a bottom feed opening 14, and feed through said opening 14 is regulated by a feed control shutter or valve 15 whose setting is regulated by a rod 16.

The hopper 13 adjacent but above the bottom feed opening 14 is fitted with an agitator mechanism which includes a horizontal cross shaft 17 driven exteriorly of said hopper and from the drive shaft 2 by an endless belt and pulley unit 18.

Within the hopper 13 and on opposite sides of the bottom feed opening 14 the cross shaft 17 is fixed with rows of agitator plates 19. The plates 19 of each row are angled on the cross shaft 17 in a manner to feed toward the opening 14.

The top of the blower housing 4 is formed, directly below the bottom feed opening 14 of the hopper 13, with the following adjustable, distributor mechanism:

The top 20 of the blower housing 4 is formed with a plurality of circumferentially spaced intake ports 21 defined by a spider 22, these ports registering with the central opening in the blower 3, as shown in Fig. 1. At the center thereof the spider 22 is fitted with an upstanding bolt 23 and a flat, circular distributor plate 24 surrounds such bolt; the distributor plate having an enlarged bore 25 which permits of said plate's adjustment a certain distance transversely of the blower axis and in any selected horizontal direction.

The circular distributor plate 24 lies flat atop the central portion of the spider 22 but laps the intake ports 21 to some extent. Such distributor plate 24 is normally locked in adjusted position by a locking cap 26 on the bolt 23 and normally maintained under pressure by said bolt against such plate.

In operation of the above described crop dusting unit the dust is fed from the hopper 13 through the bottom feed opening 14 and falls by gravity towards the blower housing; such feed in constant flow being assured by reason of the described agitator mechanism.

After feeding through the opening 14 the dust engages the distributor plate 24 and is then immediately sucked into the blower housing 4 by the blower 3 through the intake ports 21. In the housing 4 the dust is thoroughly admixed with air and is then delivered as a forceful stream through the lateral discharge pipes 7 and out of the nozzle 9 onto the crop.

Adjustment of the circular distributor plate 24 transversely of the blower axis to give varying overlap relative to the intake ports 21 is provided for the reason that it is desirable that controlled proportioning of delivery of the dust through the respective ports 21 relative to the position of the outlets 8 be obtained. With different types of dust, i. e. of different granular size or weight, the point in the circumference of the blower and housing relative to the position of the outlets 8 at which the greatest portion of the dust drops from plate 24 into the housing, is important.

A vertical plate P preferably extends between the uprights 1a from the hopper to a point below the top of housing 4 to prevent longitudinal air currents from disturbing the dust flow from the hopper outlet onto plate 24.

The above described crop dusting unit provides an efficient and effective apparatus for the dusting of crops wherein it is desirable that the dust be distributed forcefully and yet evenly through the discharge pipes 7 and out of the nozzles 9.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A crop dusting unit comprising an upstanding frame, a dust hopper mounted on the frame, a vertical axis blower mounted on the frame below the hopper in position to receive dust therefrom, means to drive the blower, said blower including a housing, the top of the housing having a circumferential row of intake openings therethrough about the blower axis and defined by a spider included in said top, a circular dust distributor plate seated on the central portion of the spider and disposed normally coaxially with respect to the blower axis and lapping the intake openings to a partial extent, said distributor plate having an enlarged central opening, a locking cap on the distributor plate over said central opening, and a bolt extending from the cap to the spider through said enlarged hole whereby to normally secure the plate in fixed position but permitting of selective adjustment thereof transversely of the blower axis, and a discharge pipe leading from the blower.

2. A crop dusting unit including in combination, a supply hopper having a downwardly discharging outlet opening, a blower, such blower including a housing, a vertical drive shaft for the blower disposed substantially co-axially with said outlet opening, the blower housing being spaced below said outlet opening, the housing being provided with a plurality of intake ports about the vertical axis of the shaft, a flat distributor plate on the upper face of the housing and partially overlapping the ports, the hopper opening being adapted to discharge material from the hopper directly onto said plate by gravity, and means mounting the plate on the housing for horizontal adjustment thereon in any direction relative to the axis of the blower.

ERIC M. WOOCK.

REFERENCES CITED

The following references are of record in the file of this patent:

UNITED STATES PATENTS

| Number | Name | Date |
| --- | --- | --- |
| 40,078 | Howard | Sept. 22, 1863 |
| 392,289 | Roach | Nov. 6, 1888 |
| 423,814 | Richards | Mar. 18, 1890 |
| 511,781 | Leggett | Jan. 2, 1894 |
| 546,526 | Greene | Sept. 17, 1895 |
| 578,400 | Gilmore | Mar. 9, 1897 |
| 684,261 | Johnson | Oct. 8, 1901 |
| 1,420,601 | Wright | June 20, 1922 |
| 1,674,391 | Dunnagan | June 19, 1928 |
| 1,724,805 | Root | Apr. 13, 1929 |
| 1,832,963 | Burger | Nov. 24, 1931 |
| 1,851,406 | Ross et al. | Mar. 29, 1932 |
| 1,862,666 | Duncan | June 14, 1932 |
| 1,957,309 | Armour | May 1, 1934 |

FOREIGN PATENTS

| Number | Country | Date |
| --- | --- | --- |
| 39,506 | Germany | June 27, 1887 |
| 382,012 | Great Britain | Oct. 20, 1932 |